(No Model.) 2 Sheets—Sheet 1.
E. E. WHIPPLE.
HARROW.
No. 492,315. Patented Feb. 21, 1893.
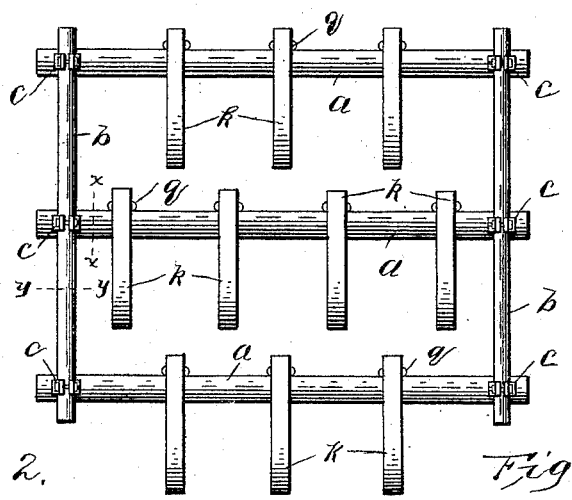
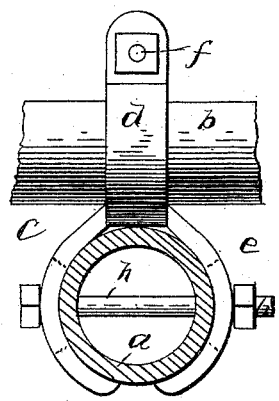
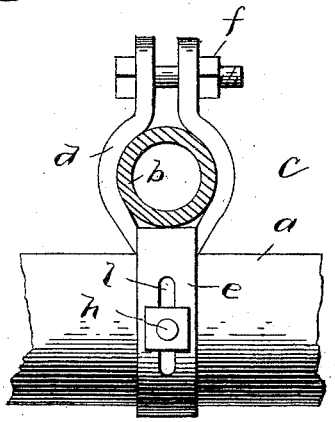
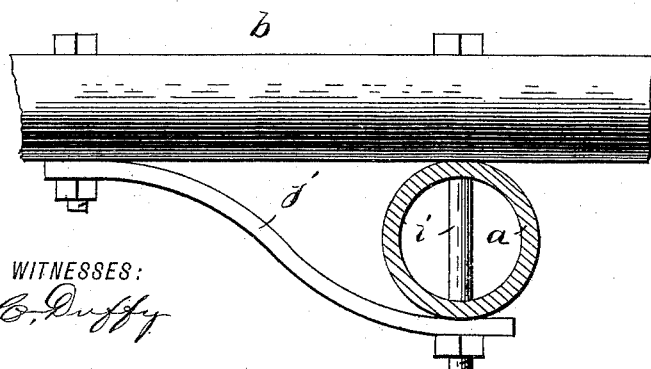
WITNESSES:
E. C. Duffy
Hubert E. Peck
INVENTOR
E. E. Whipple
BY O. E. Duffy
ATTORNEY.

(No Model.) 2 Sheets—Sheet 2.
E. E. WHIPPLE.
HARROW.
No. 492,315. Patented Feb. 21, 1893.
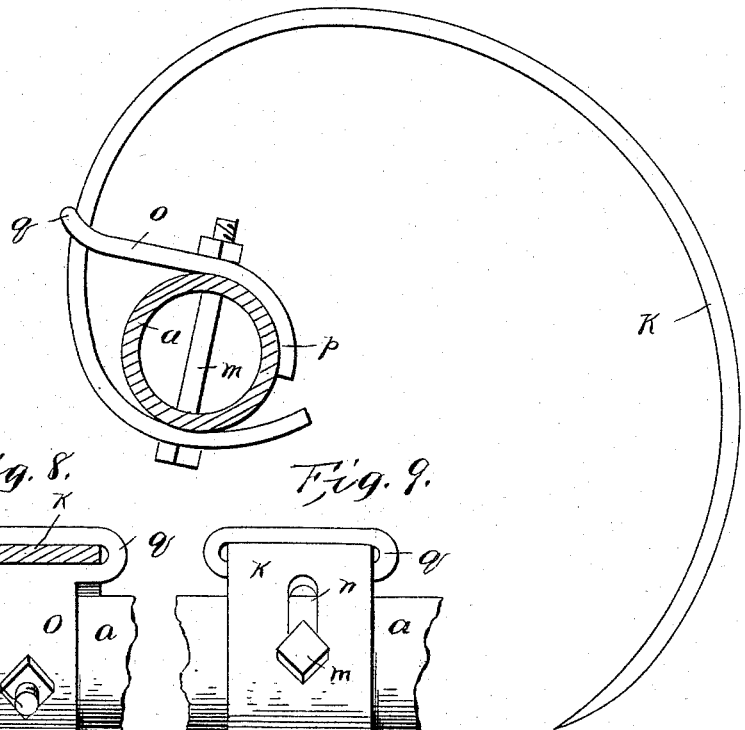
WITNESSES:
C. C. Duffy
Chas. M. West
INVENTOR
E. E. Whipple
BY O. E. Duffy
ATTORNEY.

UNITED STATES PATENT OFFICE.

EFFINGER E. WHIPPLE, OF ST. JOHN'S, MICHIGAN.

HARROW.

SPECIFICATION forming part of Letters Patent No. 492,315, dated February 21, 1893.

Application filed November 9, 1891. Serial No. 411,331. (No model.)

*To all whom it may concern:*

Be it known that I, EFFINGER E. WHIPPLE, of St. John's, in the county of Clinton and State of Michigan, have invented certain new and useful Improvements in Harrows; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in harrows or cultivators.

The object of the invention is to provide an improved harrow frame exceedingly cheap, simple, and durable in construction and composed of a minimum number of parts detachably secured together so that the beams thereof can be easily taken apart and packed in a small compass for storing or transportation and can be easily secured in operative relation when desired.

A further object of the invention is to provide improved means for fastening harrow teeth in a most simple and secure manner, and with the employment of a minimum number of parts.

A further object of the invention is to improve certain details in the construction and arrangement of parts in harrows whereby a highly efficient tool is produced which is very strong, durable and simple in construction.

These objects are accomplished by and this invention consists in certain novel features of construction and in combinations of parts more fully described hereinafter and particularly pointed out in the claims.

Referring to the accompanying drawings, Figure 1, is a top plan view of the preferred construction of harrow. Fig. 2, is a sectional view taken on the line $x$—$x$ Fig. 1. Fig. 3, is a detail sectional view taken on the line $y$—$y$ Fig. 1. Figs. 4, 5, and 6 are detail views of varied constructions of means for uniting the tooth and coupling beams. Fig. 7, is a cross section through a tooth beam showing the tooth fastening preferred. Figs. 8 and 9 are respectively top and bottom plans thereof, the tooth broken away in Fig. 8. Figs. 10 and 11 are detail views of a different form of tooth fastening embodying the same invention.

In the drawings the reference letter $a$, indicates the tooth beams for convenience shown parallel and extending straight across the frame, although I do not limit myself to such precise arrangement. These tooth beams are preferably formed, each, of a straight section of gas pipe, although metal rods could if desired be employed. The tooth beams are coupled and secured together by the coupling beams $b$, extending across the tooth beams preferably at right angles in the line of draft as shown although I do not limit myself to such precise arrangement of coupling beams. These coupling beams $b$, are preferably composed of sections of gas pipe or other strong rigid tubing although if desirable rods could be employed.

The tooth beams are removably held in position and to the coupling beams by means of detachable clamps, preferably such as shown in Figs. 2 and 3, composed each of a double clip $c$, located at the crossing points of the tooth and coupling beams. Each double clip $c$, is composed of two rings $d$, $e$, formed integral or rigidly secured together one on the other in planes at right angles to each other, said rings being located at the same angle at which the tooth and coupling beams cross. The upper clamping ring $d$, embraces a coupling beam (the coupling beams are preferably located above the tooth beams) and is split and provided with the two ends drawn tightly together rigidly clamping the coupling beam by means of the clamping bolt $f$. The lower ring $e$, embraces a tooth beam partially or completely as desired and can rigidly hold the same by friction and the two ends and clamping bolt $g$, as shown in Fig. 5, or the ring $e$, need only partially embrace the tooth beam (see Figs. 2 and 3) and have its ends perforated to receive the bolt $h$, horizontally extending through said ring ends and through the tooth beam. If desired the clamping rings can be provided with inwardly extending spurs or holding projections as shown in Fig. 6, to grasp the pipe and prevent twisting or turning thereof, this would be particularly beneficial where the lower ring constitutes a clamping ring only as shown in Fig. 5, for in the other constructions the bolt passing through the pipe prevents turning thereof.

In the construction shown in Fig. 4, the coupling beams rest directly on the tooth beams and at each crossing point a vertical bolt $i$, passes up through the tooth and coupling beams and securely clamps the same together. The bolt $i$, also clamps a brace $j$, against the under side of the tooth beam and the brace extends forwardly and upwardly and is clamped to the under side of the coupling beam by a bolt as shown.

$k$, indicate the harrow or cultivator teeth fastened suitably, as by the means hereinafter set forth to the tooth beams.

The tooth beams are preferably secured to the coupling beams to allow limited turning or rotative adjustment of the tooth beams independent of the coupling beam so that all of the teeth on a tooth beam can be adjusted at one time to cultivate at any depth required. This adjustment is accomplished where clips as shown in Fig. 5 are employed, by loosening the lower clamping ring, turning the tooth beam to raise or lower the teeth the proper distance and then tightening the lower clamping ring to hold the tooth beam in the proper adjustment. Where the bolt $h$, passing through the tooth beam is employed this turning adjustment is permitted by slots $l$, in the lower ring through which the said bolt passes. Of course if desirable, the tooth beams can be rigidly secured so as not to allow this turning adjustment, but I prefer to provide for this adjustment as it forms an important feature of this invention. The teeth $k$, are preferably formed flat as shown and curved forwardly from the under side of the tooth beam and then upwardly and rearwardly over the beam and downwardly to the ground so that the point thereof will be raised or lowered by turning the tooth beam. The teeth are preferably formed of spring metal to form a spring tooth. Other forms of teeth can be employed.

Suitable means are employed to adjustably secure each tooth to its beam, however I prefer the constructions herein after set forth.

The preferred form of fastening shown in Figs. 7, 8, and 9, consists of a bolt $m$, extending up through a longitudinal slot $n$, in the end of the tooth and the tooth beam and provided with a nut on its upper end, thereby clamping the tooth to the under side of the beam so that each tooth can be independently adjusted to raise and lower its point by means of the bolt and said slot. The bolt also passes through and clamps in place a holder or brace $o$, held upon the top of the beam. This holder has its rear end $p$, bent down on the beam to prevent turning or twisting of the holder while its front end extends forwardly and is provided with a horizontal loop or opening $q$, through which the tooth extends. By means of this holder the tooth is firmly braced and rigidly held against lateral play or twisting. Each tooth is thus independently adjustable and all the teeth on the tooth beam can be simultaneously adjusted the same distance.

In Figs. 10, and 11, a fastening is shown wherein the bolt does not pass through the beam but two bolts $u, u$, are provided on opposite sides of the beam passing through block $v$, extending diagonally across the lower side of the beam and the brace $o$, and clamping the tooth and holder or brace against the beam. The tooth in this construction is not provided with the slot. If desired these two bolts $u, u$, can be passed up through the beam to secure greater strength and rigidity.

The teeth can be suitably arranged on the tooth beams and suitable draft attachments and connections are employed which I do not show as they form no part of this invention.

Having thus fully described my invention, what I claim as new, and desire to secure by Letters Patent of the United States, is—

1. In a harrow, the series of parallel transverse pipe tooth beams, the parallel coupling beams extending over and crossing the tooth beams, the harrow teeth secured to said tooth beams, and the double clips detachably clamping said beams together at the crossing points, each clip composed of two split rings one above the other, and a clamping bolt for each ring, as described.

2. The harrow composed of crossing coupling and tooth beams, and the integral double clips detachably binding the same together, each clip composed of two expansible rings relatively rigid and split, respectively, at their upper and lower sides, and a clamping bolt for each ring to bind it on its respective beams, substantially as and for the purposes described.

3. In a harrow, the combination of the crossing tooth and coupling beams, harrow teeth, and the double clips detachably clamping said beams together, each clip composed of a split ring having separated ends, a bolt to draw the same to tightly clamp a coupling beam, and the lower ring and a bolt passed through the same and a toothed beam, substantially as described.

4. In a harrow, the combination of the crossing tooth and coupling beams, harrow teeth, and the double clips securing said beams together at their crossing points, each clip consisting of an upper ring provided with a clamping bolt, and a lower ring rigid with the upper ring and a bolt passed through a tooth and said ring, substantially as described.

5. A harrow comprising the crossing tooth and clamping beams, harrow teeth, and the double clips securing said beams together, each clip being secured at its upper end to a coupling beam and having a lower ring embracing a tooth beam provided with slotted sides, and a bolt passed through the tooth beam, and said slots, so that the tooth beam can be rocked and clamped in the desired adjustment, substantially as described.

In testimony that I claim the foregoing as my own I affix my signature in presence of two witnesses.

EFFINGER E. WHIPPLE.

Witnesses:
M. D. HUBBARD,
GEO. A. STEEL.